United States Patent
Devaney

(10) Patent No.: US 6,279,665 B1
(45) Date of Patent: Aug. 28, 2001

(54) SOD CUTTING ATTACHMENT FOR SKID-STEER VEHICLE

(75) Inventor: Charles E. Devaney, Jordan, MN (US)

(73) Assignee: Clark Equipment Company, Woodcliff Lake, NJ (US)

( * ) Notice: Subject to any disclaimer, the term of this patent is extended or adjusted under 35 U.S.C. 154(b) by 0 days.

(21) Appl. No.: 09/377,610

(22) Filed: Aug. 19, 1999

(51) Int. Cl.⁷ .................................................. A01B 45/04
(52) U.S. Cl. .................................................. 172/19
(58) Field of Search ............................ 172/19, 20, 698, 172/699, 720, 721, 724, 36, 44; 37/446, 449, 403, 404, 406

(56) References Cited

U.S. PATENT DOCUMENTS

| | | | |
|---|---|---|---|
| D. 335,883 | 5/1993 | Devaney | D15/32 |
| 2,534,838 | * 12/1950 | Wall | 172/19 |
| 2,646,740 | * 7/1953 | Luoma | 172/19 |
| 2,652,639 | 9/1953 | Kluckhohn | 37/2 |
| 2,703,044 | 3/1955 | Adair | 97/226 |
| 2,732,637 | 1/1956 | Shadden | 37/2 |
| 2,770,076 | 11/1956 | Kluckhohn | 47/58 |
| 3,512,276 | 5/1970 | Juhl | 37/2 |
| 3,747,686 | * 7/1973 | Beck | 172/19 |
| 4,018,287 | * 4/1977 | Brouwer | 172/19 |
| 4,049,060 | * 9/1977 | Hoke | 172/19 |
| 4,632,192 | * 12/1986 | Hooks | 172/19 |
| 4,895,211 | 1/1990 | Harris | 172/271 |
| 4,903,418 | 2/1990 | Loudon | 37/2 |
| 4,945,662 | 8/1990 | Kreye | 37/103 |
| 4,982,800 | * 1/1991 | Shields | 172/19 |

OTHER PUBLICATIONS

Advertising sheets for Schutt's Tree Diggers, publication date 1990.
E–Z Go Digger Operator's & Parts Manual—published prior to Jan. 1994.

\* cited by examiner

Primary Examiner—Robert E. Pezzuto
(74) Attorney, Agent, or Firm—Westman, Champlin & Kelly, P.A.

(57) ABSTRACT

A sod cutting attachment for a skid-steer motor vehicle has a pair of arms mounted on a hitch assembly adapted to be connected to lift arms of the skid-steer vehicle. A blade having upright side walls and a flat bottom wall secured to the arms operates to cut a strip of sod. Shoes mounted on the side walls of the blade control the depth of the cut of the sod.

13 Claims, 7 Drawing Sheets

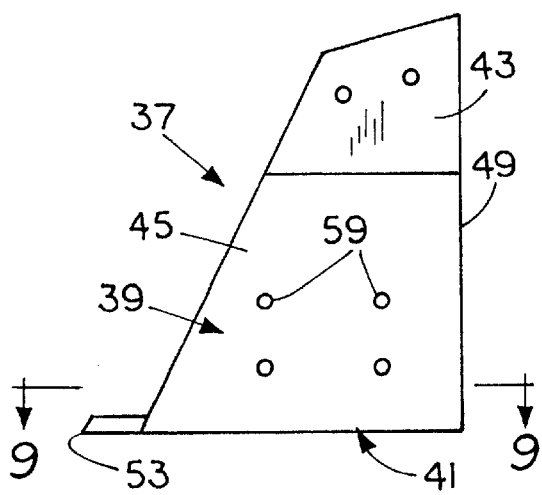
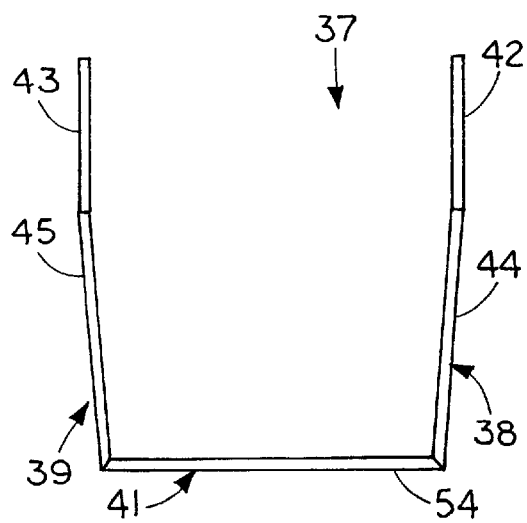
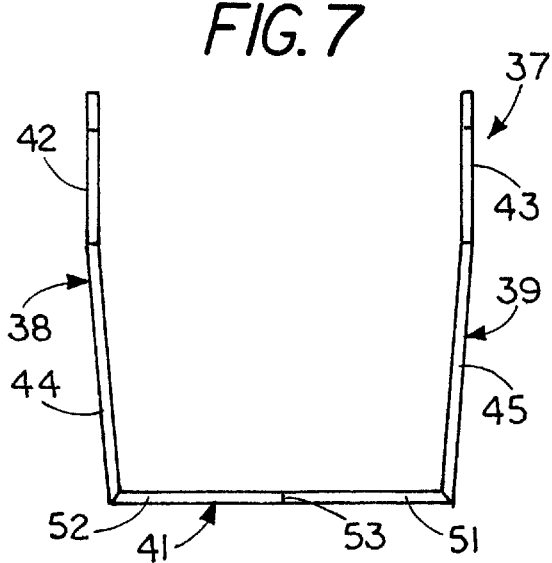

SOD CUTTING ATTACHMENT FOR SKID-STEER VEHICLE

FIELD OF THE INVENTION

The invention is in the art of digger attachments for skid-steer vehicles and tractors. The digger attachments have blades mounted on arms secured to hitch plates connected to the lift members of the vehicles.

BACKGROUND OF THE INVENTION

Spade and shovel attachments for skid-steer vehicles are used to dig holes in the ground prior to planting trees and bushes. These attachments have blades that are forced under the root systems of trees, lift the trees, and transport the trees to a tree carrier vehicle or place the trees directly in the holes in the ground. Examples of digger attachments useable with skid-steer vehicles to remove and transplant trees are disclosed by E. H. Kluckhohn in U.S. Pat. No. 2,770,076; J. L. Juhl in U.S. Pat. No. 3,512,276; R. W. Loudon in U.S. Pat. No. 4,903,418 and C. E. Devaney in U.S. Pat. No. Des. 335,883. These shovel attachments have blades with concave curved or angles bottoms which preclude cutting a flat strip of sod and digging a flat bottom trench. Digging depth gauges are not used with these shovel attachments as there is no need to control the distance that the blades penetrate into the ground. The sizes of the blades determines the digging depths of the attachments.

SUMMARY OF THE INVENTION

The invention is a sod cutting and shovel attachment for a motor vehicle for cutting an elongated strip of sod from a field of sod. The attachment has a frame connected to a hitch assembly adapted to be coupled to lift structures on the motor vehicle, such as a skid-steer tractor. A blade having upright side walls and a flat bottom wall joined to the side walls is secured to the arms. The blade is useable as a shovel to dig a flat bottom trench in the ground. The flat bottom wall has a transverse rear cutting edge and forwardly converging front cutting edges. Shoes mounted on the side walls of the blade located above the plane of flat bottom wall control the depth of the cut of the strip of sod.

In the preferred embodiment of the attachment, the side walls of the blade have upper and lower portions inclined downwardly and inwardly to the bottom wall. The shoes attached to the lower portions of the side walls are vertically adjustable on the side walls to adjust the depth of cut of the strip of sod. The lower portions of the side walls each have upright front and rear cutting edges extended upwardly from the bottom wall for taper cutting the side edges of the strip of sod. The shoes can be removed from the side walls of the blade to allow the attachment to be used to dig a flat bottom trench.

A modification of the sod cutting attachment has a device for curling the strip of cut sod into a roll of sod. The device has a semi-circular body joined to a linear tongue. A fastener secures the tongue to the flat bottom wall of the blade to retain the curved body in an upright position. When the attachment is moved with the motor vehicle, the sod is cut in an elongated strip of sod. The strip of sod moves along the upward curved path of the device and curls into a roll of sod positioned in the blade of the attachment. The operator of the motor vehicle continues cutting the strip of sod until the rolled sod fills the space between the side walls of the blade and the sod rolling device. The rolled sod is then dumped from the attachment to a selected location.

DESCRIPTION OF THE DRAWINGS

FIG. 5 is a side elevational view of the blade of the side cutting attachment;

FIG. 6 is a rear elevational view of FIG. 5;

FIG. 7 is a front elevational view of FIG. 5;

DESCRIPTION OF THE PREFERRED EMBODIMENTS

Figure 1:
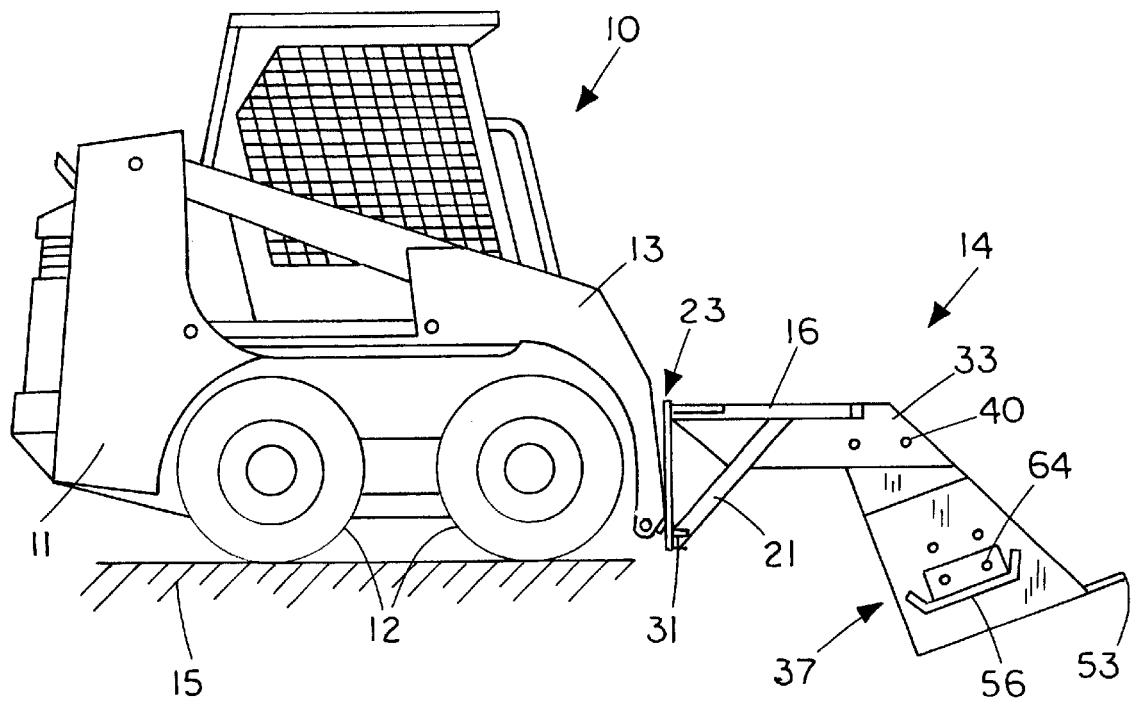
FIG. 1 is a side elevational view of a skid-steer motor vehicle having the sod cutting attachment of the invention.

A conventional skid-steer motor vehicle 10, shown in FIG. 1, has a frame 11 supported on ground 15 with drive wheels 12. A pair of lift arms 13 pivotally mounted on frame 11 is hitched to the sod cutting attachment 14 of the invention. Sod cutting attachment is used to cut elongated strips of grass and soil known as sod from the soil covered with sod. The cut sod has generally uniform thickness and width. The sod is cut with a cutting blade 37 having an open top for clear operator observation of the cutting of the sod.

Figure 2:
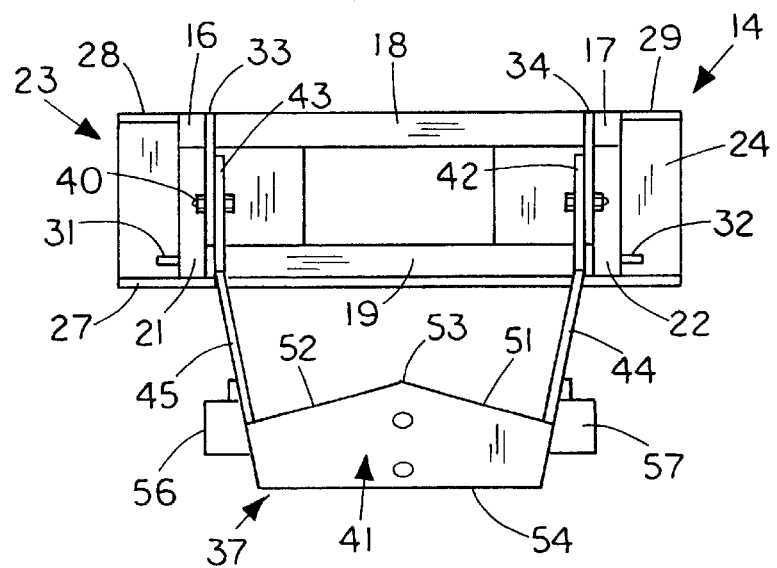
FIG. 2 is an enlarged front elevational view of the sod cutting attachment shown in FIG. 1.
Figure 3:
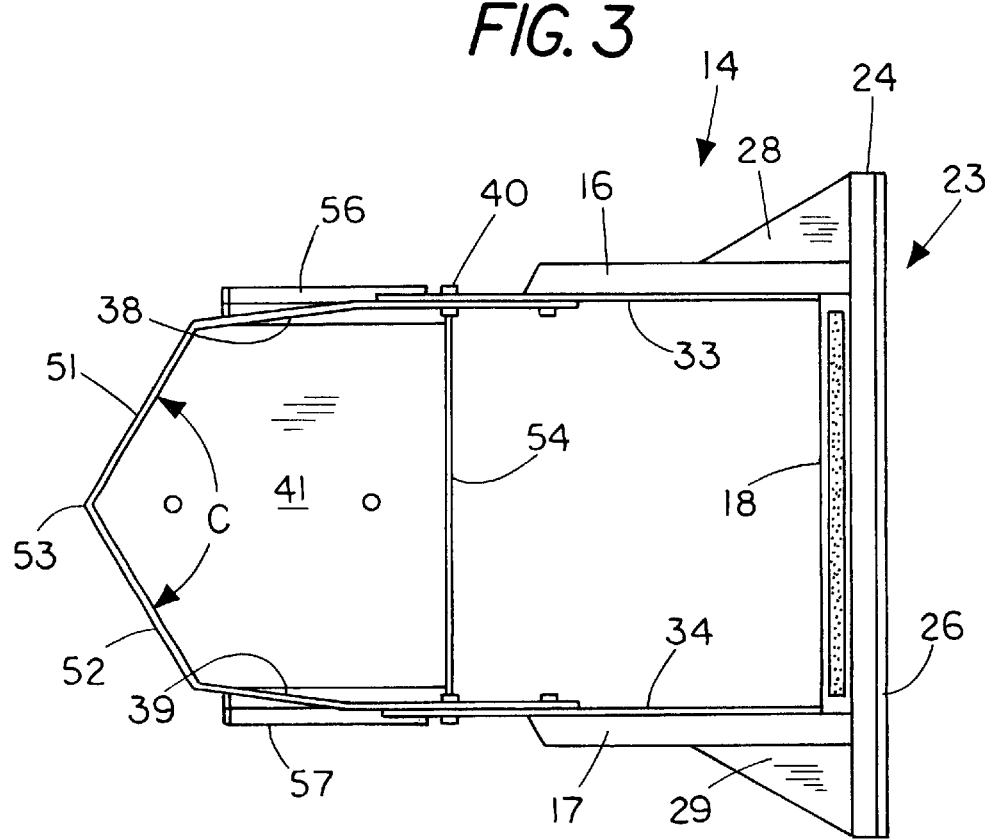
FIG. 3 is an enlarged top plan view of the sod cutting attachment.

As shown in FIGS. 2 and 3, sod cutting attachment 14 has a pair of parallel forwardly extended arms 16 and 17 attached to a cross beam 18. Arms 16 and 17 are rigid tubular metal members laterally spaced from each other. A second cross beam 19 located below beam 18 is secured to upwardly and forwardly extended brace members 21 and 22. The upper ends of members 21 and 22 are secured to middle portions of arms 16 and 17 to support arms 16 and 17. The cross beams 18 and 19 are secured to a universal hitch assembly indicated generally at 23. The lift arms 13 of skid-steer vehicle 10 have coupling structures (not shown) adapted to be connected to hitch assembly 23. Hitch assembly 23 has an upright transverse plate 24, an inclined upper lip 26, and a bottom flange 27. An example of a hitch assembly for a skid-steer motor vehicle is disclosed by J. L. Kelly in U.S. Pat. No. 4,749,048. Gusset plates 28 and 29 are secured to arms 16 and 17 and hitch plate 24. Second gusset plates 31 and 32 secure the lower ends of brace members 21 and 22 to hitch plate 24. Gusset plates 28, 29 and 31, 32 laterally reinforce arms 16 and 17 and brace members 21 and 22.

Figure 4:
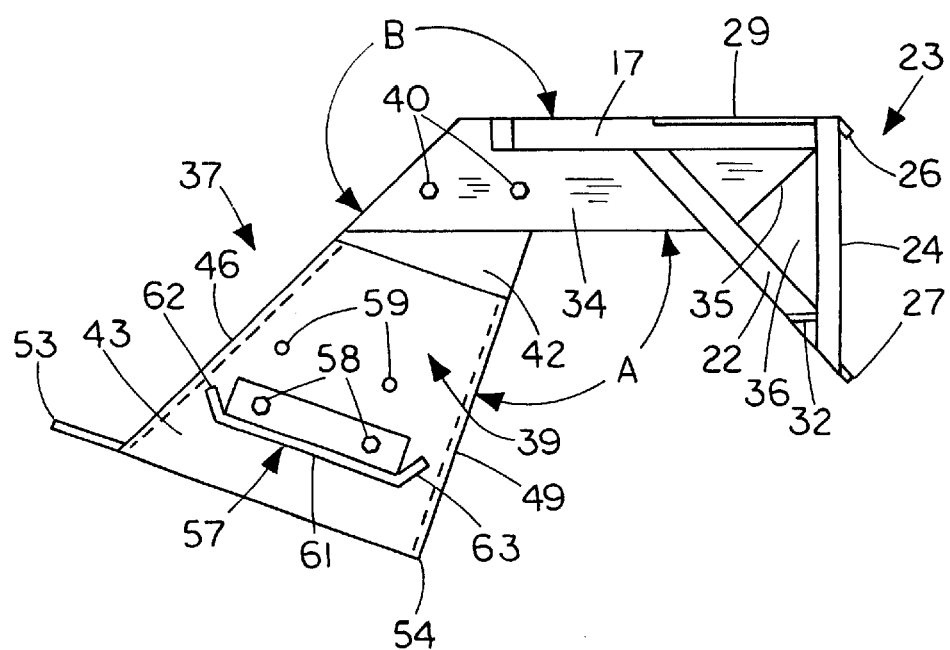
FIG. 4 is an enlarged side elevational view of the sod cutting attachment.
Figure 8:
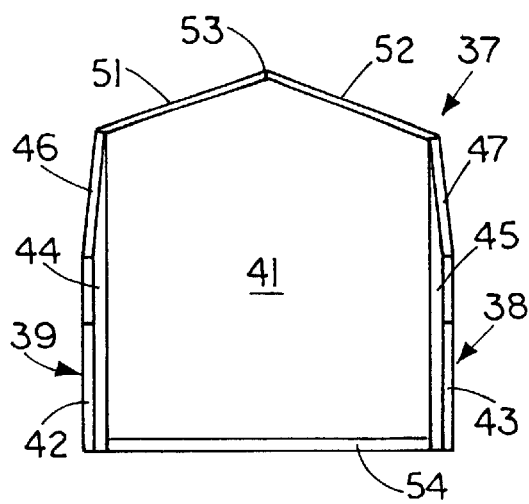
FIG. 8 is a top plan view of FIG. 5.

As shown in FIGS. 2, 3, and 4, side plates 33 and 34 are secured to the insides of arms 16 and 17. Plates 33 and 34 have downwardly and forwardly rear ends 35 spaced from hitch plate 24 to provide openings 36 between brace members 21 and 22 and hitch plate 24. Openings 36 allow cables, rope or chains to be used to tie down the attachment for transport to a desired location.

Figure 9:
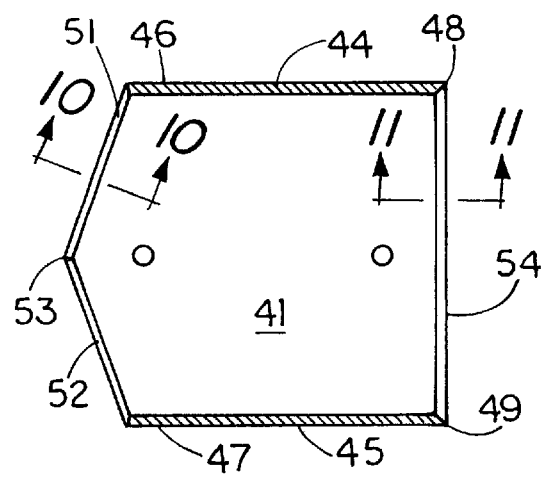
FIG. 9 is a sectional view taken along line 9—9 of FIG. 5.
Figure 10:
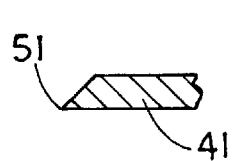
FIG. 10 is an enlarged sectional view taken along line 10—10 of FIG. 9.
Figure 11:
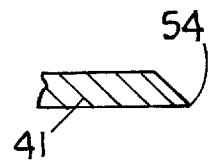
FIG. 11 is an enlarged sectional view taken along line 11—11 of FIG. 9.
Figure 12:
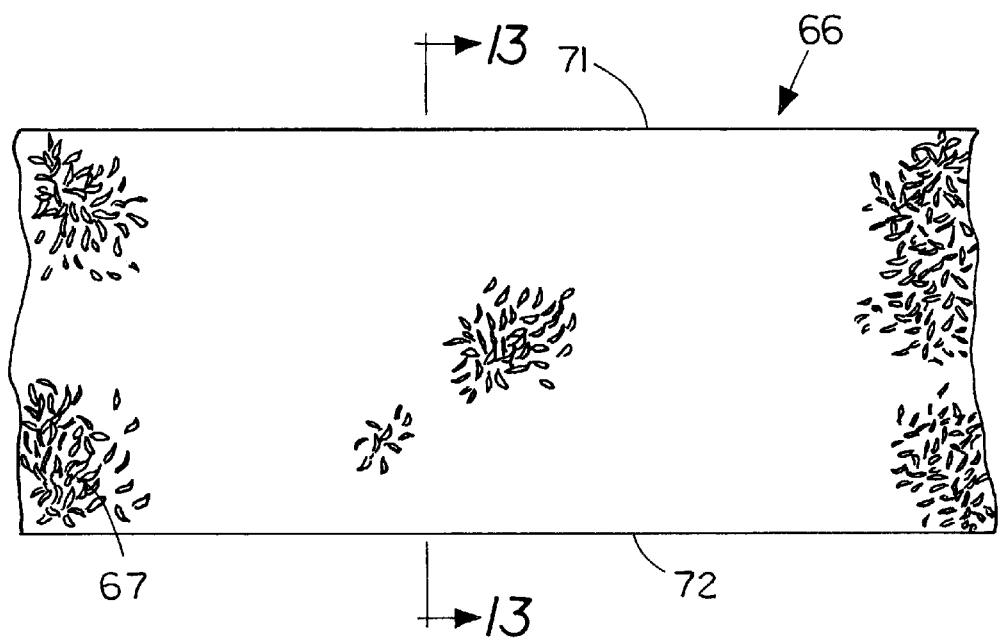
FIG. 12 is a top plan view of a strip of sod cut with the sod cutting attachment.
Figure 13:
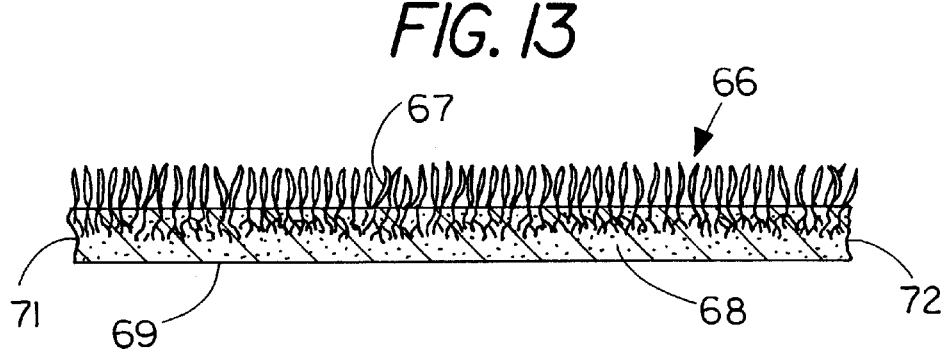
FIG. 13 is an enlarged sectional view taken along line 13—13 of FIG. 12.

An earth cutting blade, indicated generally at 37, is attached to side plates 33 and 34 with nut and bolt assemblies 40. Blade 37 can be secured with welds to side plates 33 and 34. Blade 37 has upright side members or walls 38 and 39 joined to a flat or planar bottom wall 41. Side walls 38 and 39 have upper portions 42 and 43 and lower portions 44 and 45. Lower portions 44 and 45 taper or converge downwardly to opposite side of bottom wall 41. The taper of each lower portion is between 2 to 4 degrees from the vertical planes of upper portions 42 and 43. Lower portions 44 and 45 have front upright cutting edges 46 and 47 and rear upright cutting edges 48 and 49. As shown in FIG. 4, the angle A between cutting edges 48 and 49 and the horizontal plane of arms 16 and 17 is about 110 degrees. The angle B between cutting edges 46 and 47 and the horizontal plane of arms 16 and 17 is about 135 degrees. Bottom wall 41 has a forwardly converging lip having converging cutting edges 51 and 52 joined at a point 53. As shown in FIG. 3, the angle C between edges 51 and 52 about 130 degrees. Other obtuse angles can be used for converging cutting edges 51 and 52. As seen in FIGS. 5 and 9, the lip cutting edges 51 and 52 and point 53 are located forwardly of cutting edges 46 and 47 on side walls 38 and 39. The rear of bottom wall 41 has a transverse cutting edge 54 generally aligned with upright cutting edges 48 and 49 on side walls 38 and 39.

The depth of the cut of bottom wall 41 is regulated with depth gauges shown as shoes 56 and 57. Bolts 58 secure shoe 57 to lower portion 43 of side wall 39 as shown in FIG. 4. Side wall 43 has additional holes 59 for bolts 58 to allow vertical adjustment of shoe 57 relative to bottom wall 41. Shoe 57 has a flat bottom 61 and upward turned ends 62 and 63. Bottom 61 of shoe 57 is parallel with and above the flat plane of bottom wall 41. As shown in FIG. 1, shoe 56 is secured to lower portion 45 of side wall 38 with bolts 64. Shoe 56 has the same structure and operation as shoe 57. The distance between the bottom 61 of shoes 56 and 57 and bottom wall 41 determine the thickness of the strip of sod.

In use, attachment 14 hitched to skid-steer motor vehicle operates to cut a strip of sod or turf 66. Sod 66 is grass plants 67 having roots anchored in top soil 68. Blade 37 is moved with lift arms 13 to locate point 53 and cutting edges 51 and 52 below the surface of the ground. Shoes 56 and 57 ride on the grass and ground surface to maintain the depth of the cut of the sod. Skid-steer motor vehicle 10 is moved forward whereby bottom wall 41 cuts a generally flat bottom 69 and side cutting edges 46 and 47 cut downwardly and inwardly tapered sod side edges 71 and 72. The flat bottom wall 41 retains the flat condition of the strip of sod and keeps the soil compact around the roots of plants 67.

Skid-steer motor vehicle 10 can be moved in a rearward direction to cut a strip of sod. Transverse cutting edge 54 is placed below the sod. When vehicle 10 is moved in the rearward direction edge 54 and bottom wall 41 sever a strip of sod from the turf. The flat bottom wall 41 keeps the sod flat and the soil compact about the roots of the grass plants 67.

Figure 14:
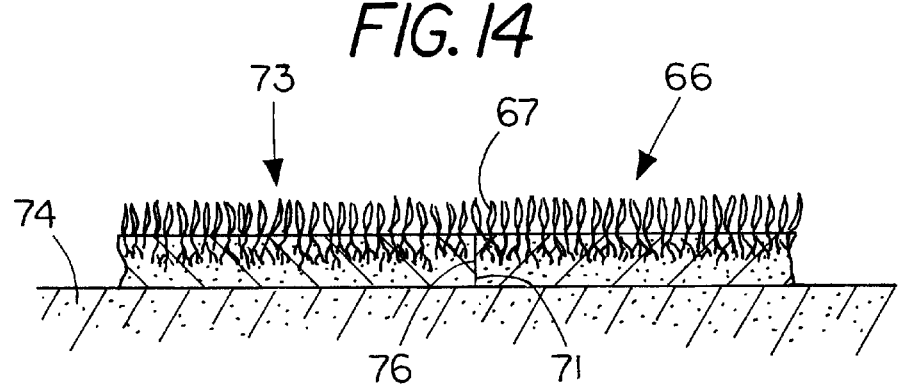
FIG. 14 is a sectional view of side-by-side sod strips cut with the sod cutting attachment.
Figure 15:
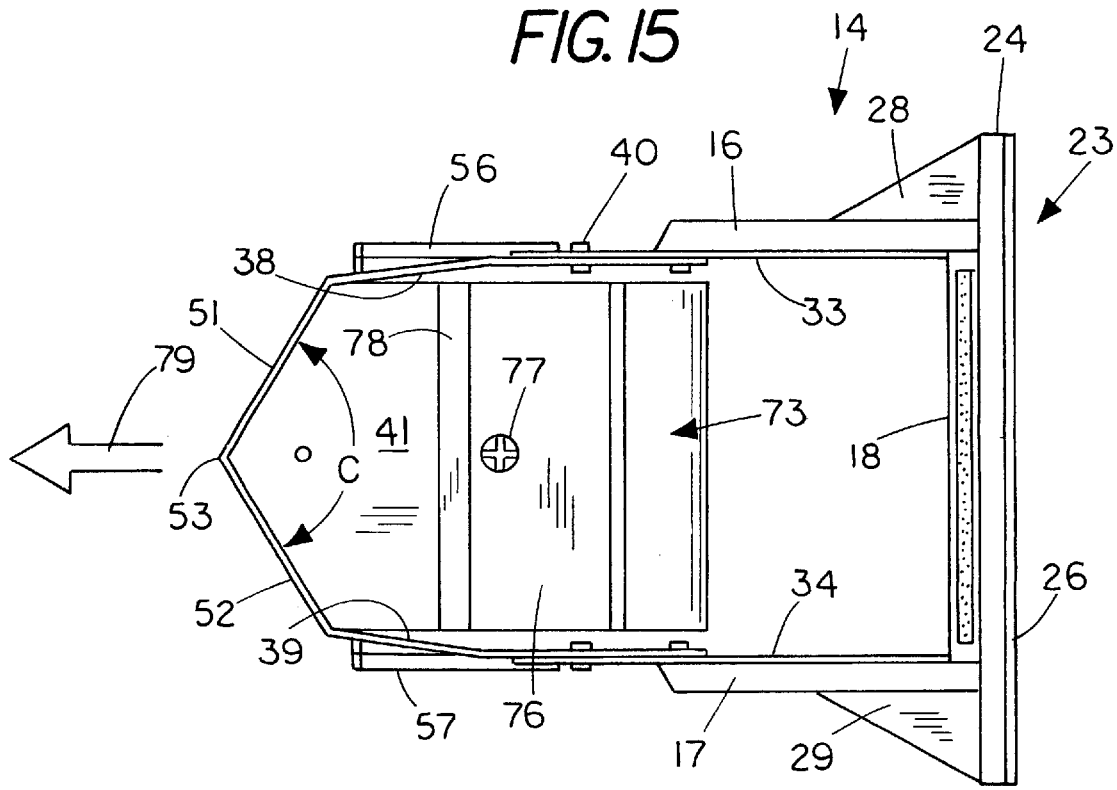
FIG. 15 is a top plan view of the sod cutting attachment equipped with a front sod rolling device.
Figure 16:
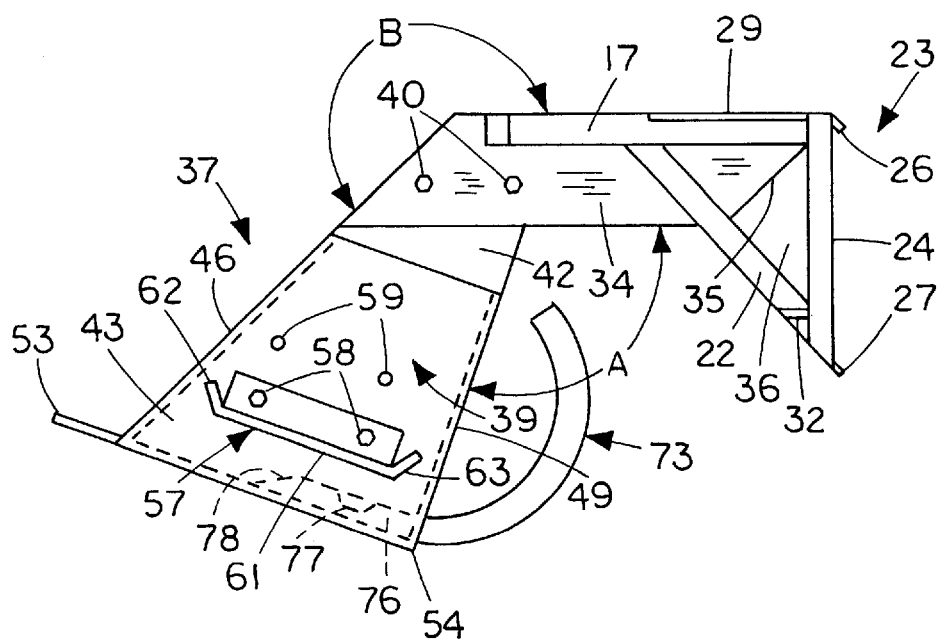
FIG. 16 is a side elevational view of FIG. 15.

As shown in FIG. 14 when strips of sod 66 and 73 are placed on a soil bed 74 side-by-side the adjacent side edges 71 and 76 contact each other. The grass 67 of sod 66 and 73 is in close fit relationship with the soil covered with grass due to the taper of side edges 71 and 76. A soil seam between adjacent strips of sod has been eliminated.

Sod rolling devices 73 and 74 mounted on blade 37 are shown in FIGS. 15–18. Sod rolling device 73 is a one piece generally semi-circular rigid plastic or metal member having a tongue 76 between side walls 38 and 39 and in engagement with bottom wall 41. Bolt 77 secures tongue 76 to bottom wall 41. Tongue 76 has a front transverse lip 78 tapered down toward bottom wall 41 to allow the sod to move along the curved path of device 73. Movement of attachment 14 in the forward direction, shown by arrow 79 in FIG. 15, cuts a strip of sod and turns the cut sod into a roll of sod. The roll of sod is retained in blade 37 until it is deposited on the turf or a sod transport vehicle.

Figure 17:
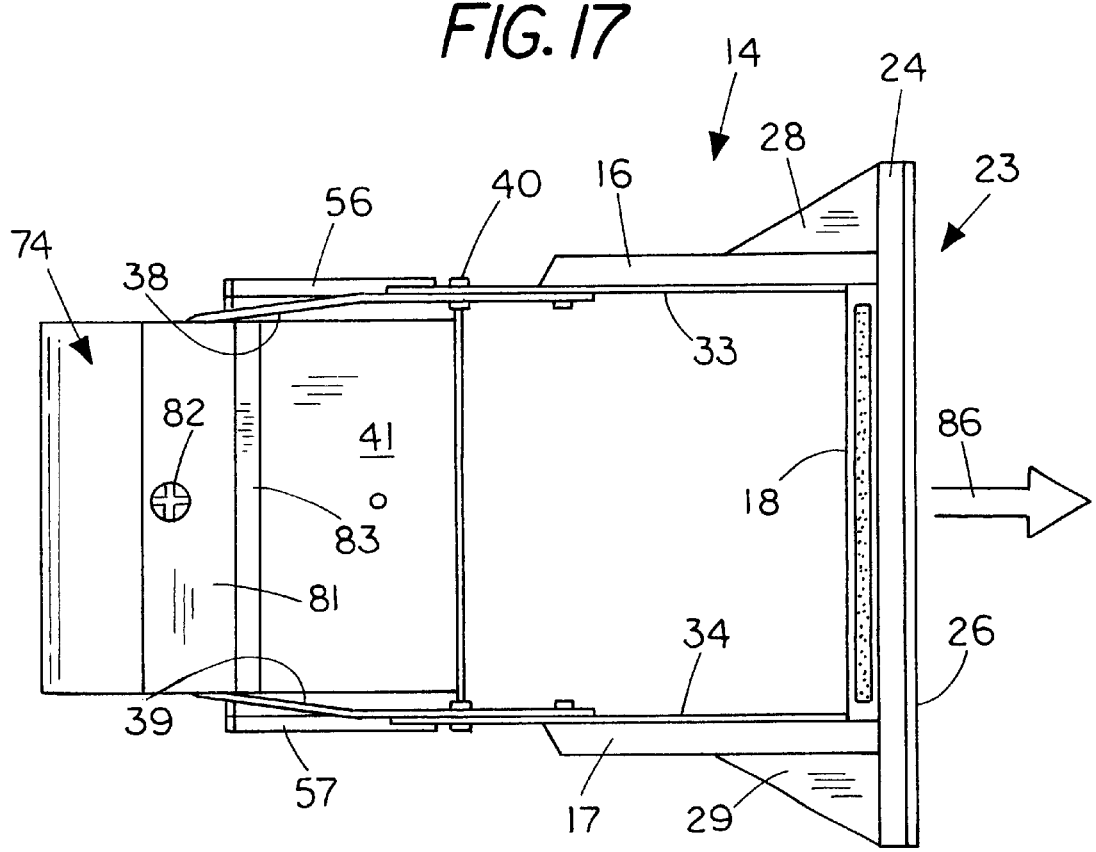
FIG. 17 is a top plan view of the sod cutting attachment equipped with a rear sod rolling device.
Figure 18:
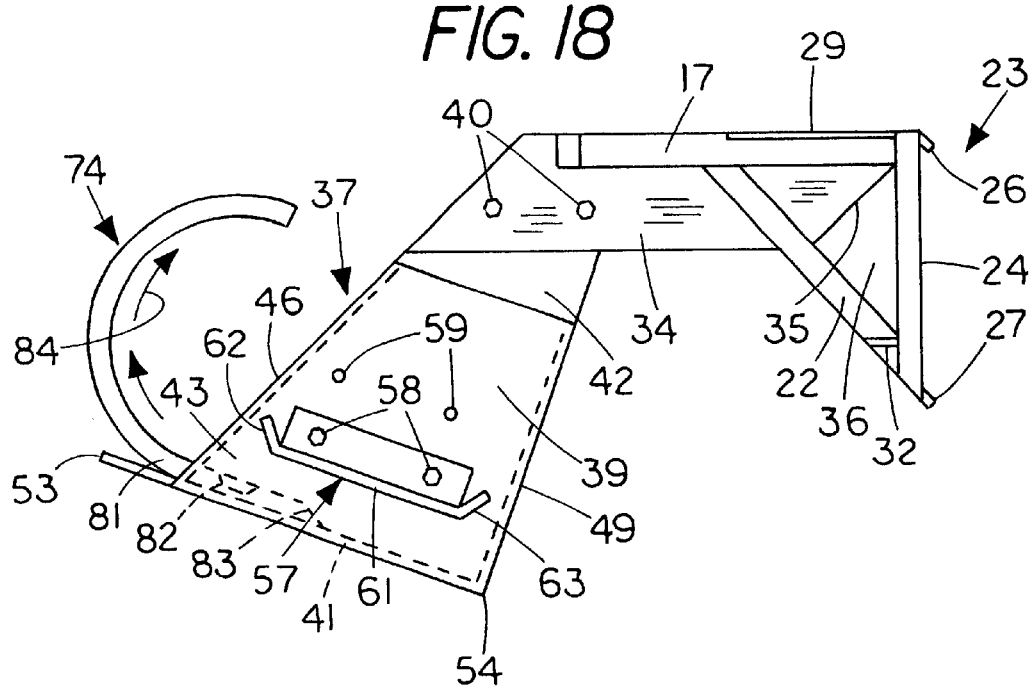
FIG. 18 is a top plan view of FIG. 17.

As shown in FIGS. 17 and 18, sod rolling device 74 has a tongue 81 located between side walls 38 and 39 and resting on bottom wall 41. A bolt 82 secures tongue 81 to bottom wall 41. Tongue 81 has a tapered transverse lip 83 to guide sod along the curved path shown by arrows 84 of device 74. Movement of attachment 14 in the backward direction, shown by arrow 86, cuts a strip of sod and turns the cut sod into a roll of sod. The roll of sod is held in the blade 37 until it is dumped on the turf Attachment 14 hitched to skid-steer vehicle 10 can be used to dig flat bottom trenches in the ground. The shoes 56 and 57 are removed from the side walls 38 and 39 to allow the blade 37 to be forced into the ground to dig a trench.

There has been shown and described several embodiments of the sod cutting attachment and shovel of the invention. Changes in the structures and arrangements of structure can be made by person skilled in the art without departing from the novel and advantageous features of the invention.

What is claimed is:

1. A sod cutting attachment with a loader having a vehicle frame, lift arms pivotally mounted to the vehicle frame with outer ends that are raisable and lowerable, the sod cutting attachment being operable to cut an elongated strip of sod from a field of sod comprising: an attachment frame, a hitch assembly including a transverse plate secured to the attachment frame, the transverse plate adapted to be coupled to the lift arms, a blade connected to the attachment frame, said blade having upright spaced apart side walls and a flat bottom member joined to the side walls, the side walls supporting the bottom member below the lift arms, and the transverse plate and the transverse plate extending between the side walls, said bottom member having a rear transverse cutting edge extended between the side walls, and shoes mounted on the side walls above the plane of the bottom member for controlling the depth of the cut of the cutting edge during cutting of a strip of sod.

2. The attachment of claim 1 wherein: the attachment frame includes a pair laterally spaced frame arms, a separate side plate secured to each frame arm, and means attaching each side wall of the blade to a separate one of the side plates.

3. The attachment of claim 2 wherein: each side wall has an upper portion and a lower portion joined to the bottom member, said lower portion being inclined downwardly and inwardly to the bottom member, and means mounting the shoes on the lower portions of the side walls.

4. The attachment of claim 1 wherein: each side wall has a rear edge extended in a downwardly and forwardly direction.

5. The attachment of claim 4 wherein: each rear edge of the side wall is a cutting edge.

6. The attachment of claim 1 wherein: each side wall has a front edge extended in a downwardly and forwardly direction.

7. The attachment of claim 6 wherein: each front edge of the side wall is a cutting edge.

8. The attachment of claim 1 wherein: the bottom member has forwardly and inwardly directed cutting edges that converge to a single point.

9. The attachment of claim 1 wherein: the shoes comprise a first shoe mounted on the outside of the lower portion of one of the side walls and a second shoe mounted on the outside of the lower portion of the other side wall.

10. The attachment of claim 9 wherein: each shoe has a generally flat bottom and upright ears at opposite ends of the generally flat bottom.

11. The attachment of claim 9 including: means for adjusting the vertical positions of the shoes on the side walls to adjust the depth of the cut of the cutting edge during cutting of a strip of sod.

12. The attachment of claim 1 including: means attached to the bottom member for causing a cut strip of sod to turn into a roll of sod during the cutting of the strip of sod.

13. The attachment of claim 12 wherein: said means for causing a cut strip of sod to turn into a roll of sod comprises a generally C-shaped member, and means for attaching the C-shaped member to the bottom member.

* * * * *